(12) United States Patent
Shin et al.

(10) Patent No.: US 11,316,141 B2
(45) Date of Patent: Apr. 26, 2022

(54) METHOD FOR PRODUCING LITHIUM SECONDARY BATTERY THICK FILM AND METHOD FOR PRODUCING LITHIUM SECONDARY BATTERY BY USING ELECTROSTATIC SLURRY SPRAYING OF SLURRY CONTAINING SULFIDE-BASED SOLID ELECTROLYTE

(71) Applicant: INDUSTRY-UNIVERSITY COOPERATION FOUNDATION HANYANG UNIVERSITY, Seoul (KR)

(72) Inventors: Dong Wook Shin, Seongnam-si (KR); Chan Hwi Park, Seoul (KR); Se Wook Lee, Guri-si (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 600 days.

(21) Appl. No.: 16/319,672

(22) PCT Filed: Jul. 19, 2017

(86) PCT No.: PCT/KR2017/007758
§ 371 (c)(1),
(2) Date: Jan. 22, 2019

(87) PCT Pub. No.: WO2018/016866
PCT Pub. Date: Jan. 25, 2018

(65) Prior Publication Data
US 2021/0280842 A1    Sep. 9, 2021

(30) Foreign Application Priority Data
Jul. 19, 2016    (KR) .................... 10-2016-0091542

(51) Int. Cl.
*H01M 4/04* (2006.01)
*H01M 4/36* (2006.01)
(Continued)

(52) U.S. Cl.
CPC ......... *H01M 4/0404* (2013.01); *H01M 4/364* (2013.01); *H01M 4/623* (2013.01);
(Continued)

(58) Field of Classification Search
CPC .... H01M 4/0404; H01M 4/364; H01M 4/623; H01M 10/0525; H01M 10/0562; H01M 2004/021; H01M 2300/0068
See application file for complete search history.

(56) References Cited

U.S. PATENT DOCUMENTS

| | | | | |
|---|---|---|---|---|
| 10,439,198 B2 * | 10/2019 | Hayashi | .............. | H01M 10/058 |
| 2005/0095369 A1 * | 5/2005 | Selman | ............... | H01M 8/1253 427/458 |

(Continued)

FOREIGN PATENT DOCUMENTS

| | | |
|---|---|---|
| JP | 2010-163356 A | 7/2010 |
| JP | 2013-155087 A | 8/2013 |

(Continued)

OTHER PUBLICATIONS

Machine Translation of KR10-1502445 (Aug. 5, 2021) (Year: 2021).*

(Continued)

*Primary Examiner* — Matthew J Merkling
(74) *Attorney, Agent, or Firm* — Sughrue Mion, PLLC

(57) ABSTRACT

Provided are a method for producing a lithium secondary battery thick film and a method for producing a lithium secondary battery, by using electrostatic slurry spraying of slurry containing a sulfide-based solid electrolyte. Particularly, the method for producing a lithium secondary battery (Continued)

thick film comprises: a step of preparing slurry in which the powder of a sulfide-based solid electrolyte is mixed with at least one solvent selected between a dichloroethane and a dichlorobenzene, at the weight ratio of 1:10 to 1:100; and a step of depositing a lithium secondary battery thick film by electrostatically spraying the slurry on a current collector under a nitrogen atmosphere in the cone-jet mode.

8 Claims, 14 Drawing Sheets

(51) Int. Cl.
  *H01M 4/62* (2006.01)
  *H01M 10/0525* (2010.01)
  *H01M 10/0562* (2010.01)
  *H01M 4/02* (2006.01)

(52) U.S. Cl.
  CPC ... *H01M 10/0525* (2013.01); *H01M 10/0562* (2013.01); *H01M 2004/021* (2013.01); *H01M 2300/0068* (2013.01)

(56) References Cited

U.S. PATENT DOCUMENTS

| | | | |
|---|---|---|---|
| 2008/0029026 A1* | 2/2008 | Selman | B05B 5/025 118/621 |
| 2010/0311036 A1* | 12/2010 | He | A01N 1/0284 435/2 |
| 2012/0082884 A1* | 4/2012 | Orilall | H01M 50/411 429/145 |
| 2014/0004257 A1 | 1/2014 | Kubo et al. | |
| 2014/0106079 A1* | 4/2014 | Myers | B29C 41/006 427/458 |
| 2014/0268502 A1* | 9/2014 | Biler | H01G 9/15 361/525 |
| 2019/0140313 A1* | 5/2019 | Terai | H01M 4/136 |

FOREIGN PATENT DOCUMENTS

| | | |
|---|---|---|
| KR | 10-1161236 B1 | 7/2012 |
| KR | 10-1502445 B1 | 3/2015 |
| KR | 10-1506833 B1 | 3/2015 |

OTHER PUBLICATIONS

Machine Translation of JP2013155087A (Aug. 5, 2021) (Year: 2021).*

International Search Report of PCT/KR2017/007758 dated Nov. 7, 2017.

* cited by examiner

[Fig 1]
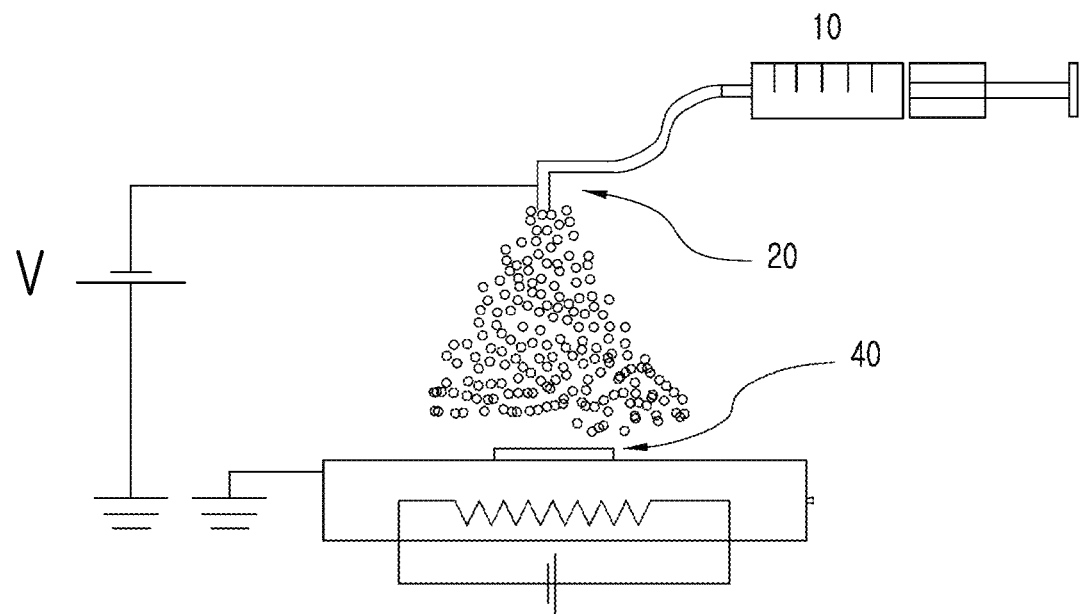
[Fig 2]
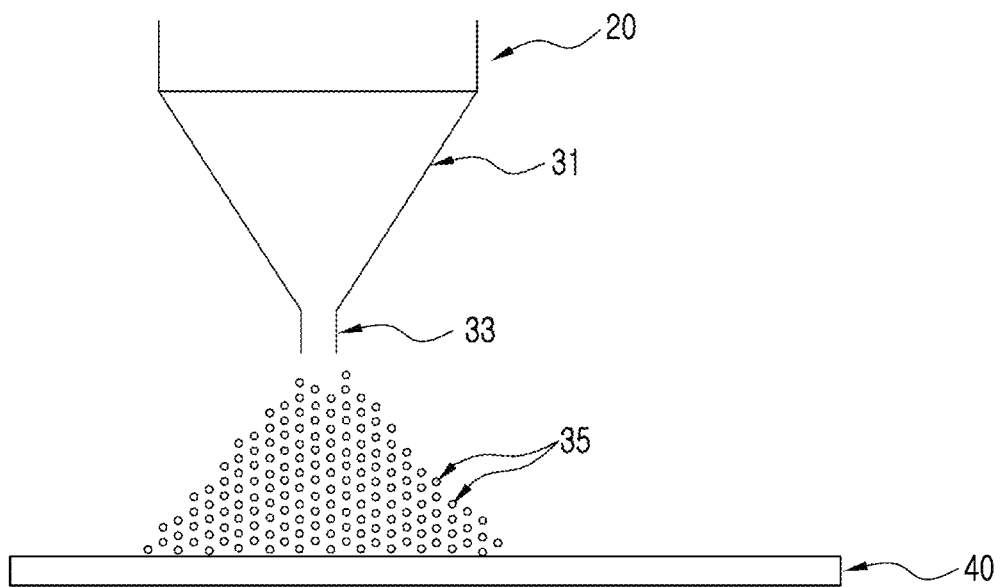

[Fig 3A] 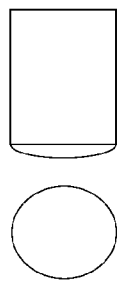
[Fig 3B] 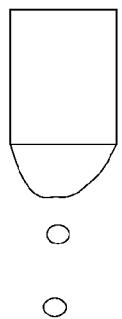
[Fig 3C] 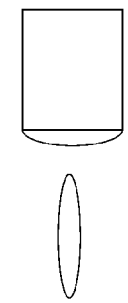
[Fig 3D] 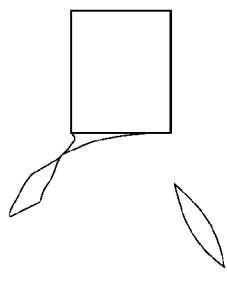
[Fig 3E] 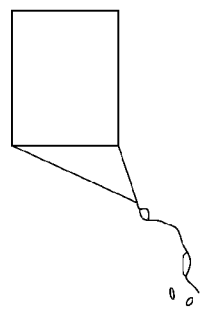
[Fig 3F] 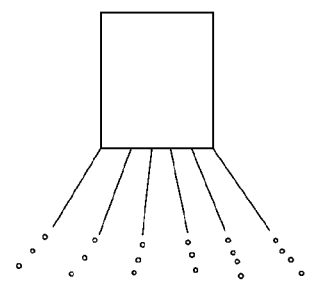
[Fig 4]
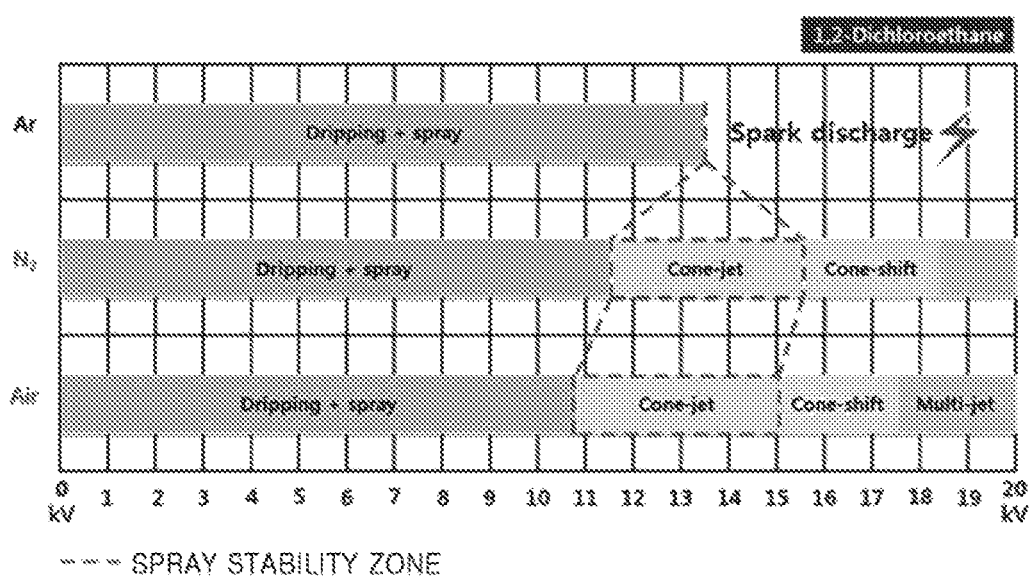
- - - SPRAY STABILITY ZONE

[Fig 5]
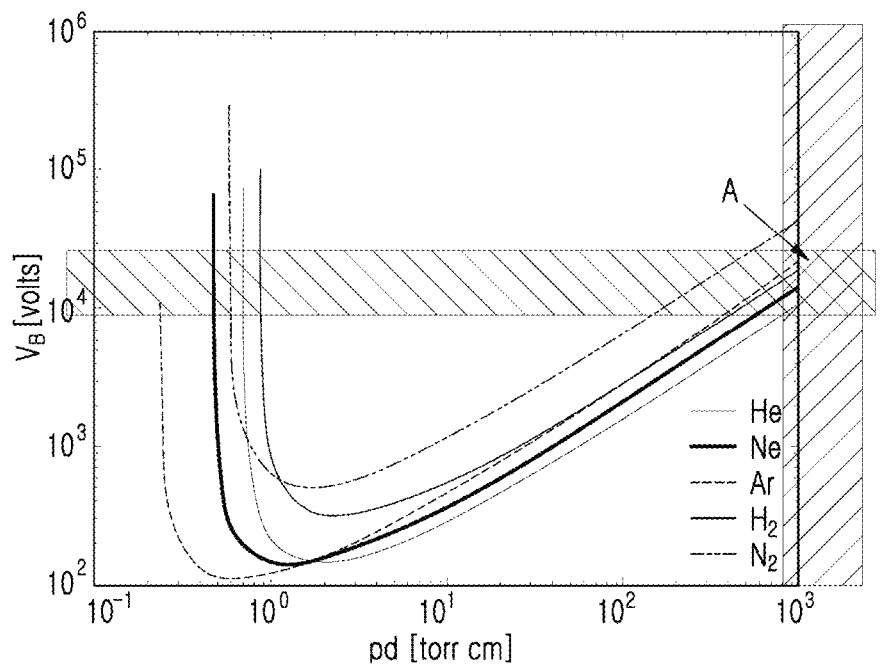
[Fig 6]
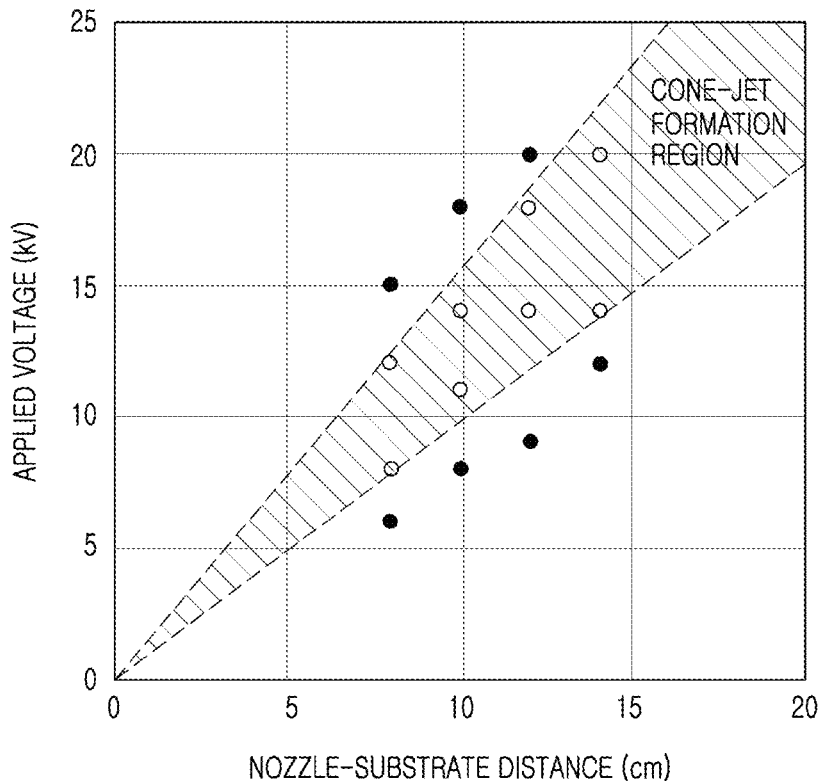

[Fig 7]
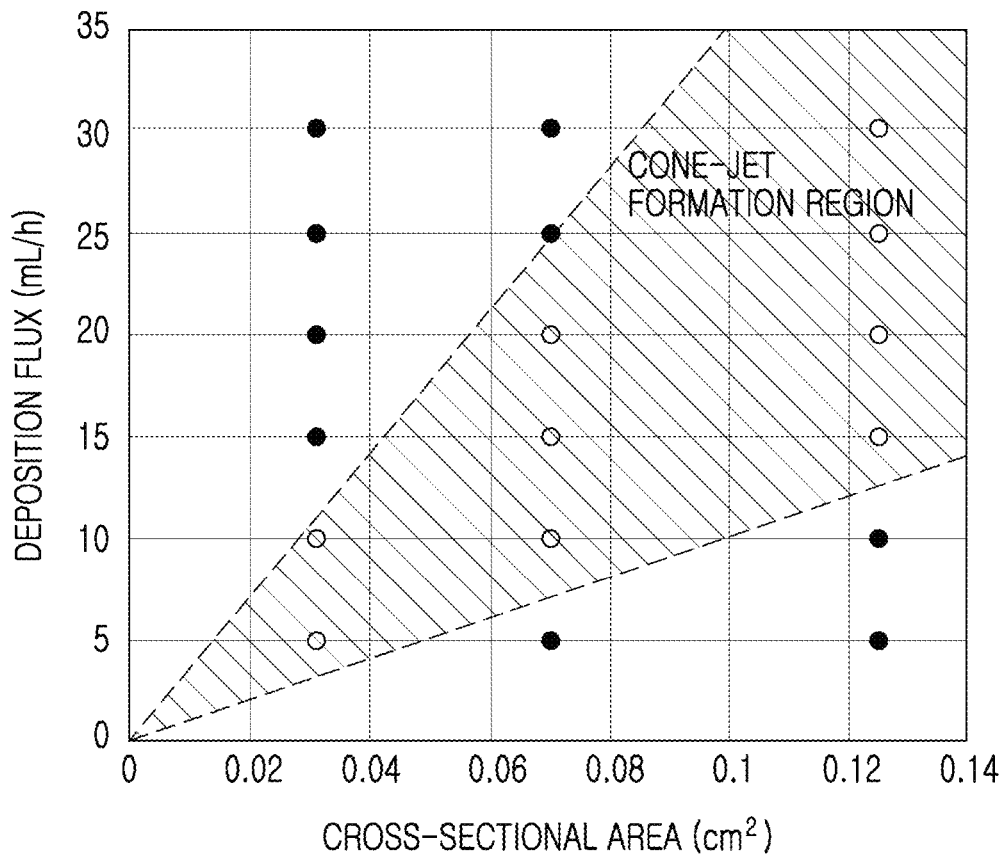
[Fig 8]
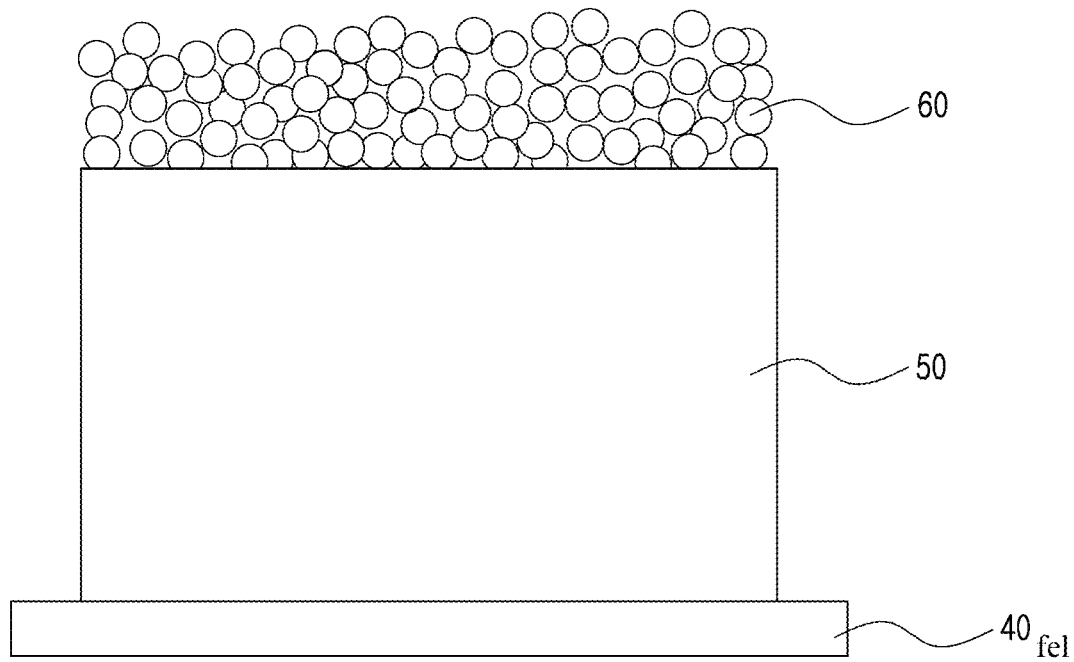

[Fig 9]
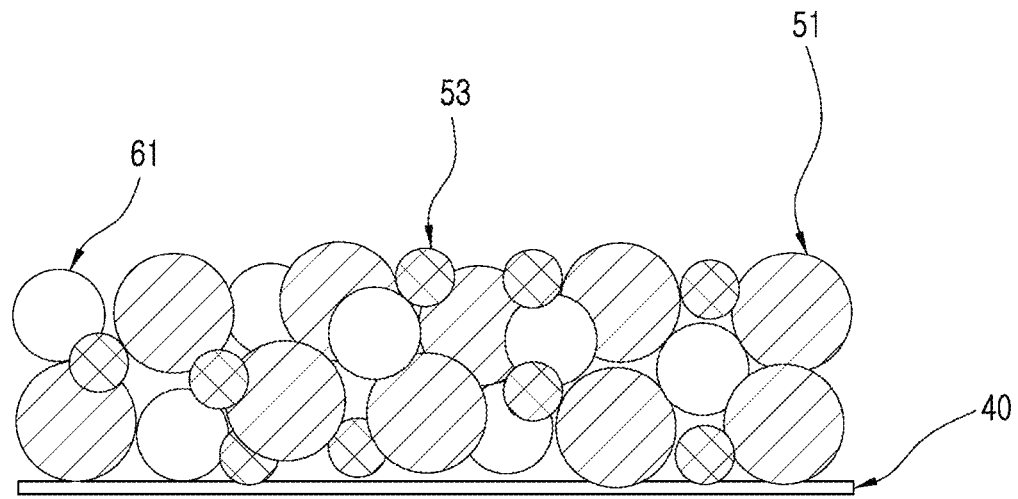
[Fig 10]
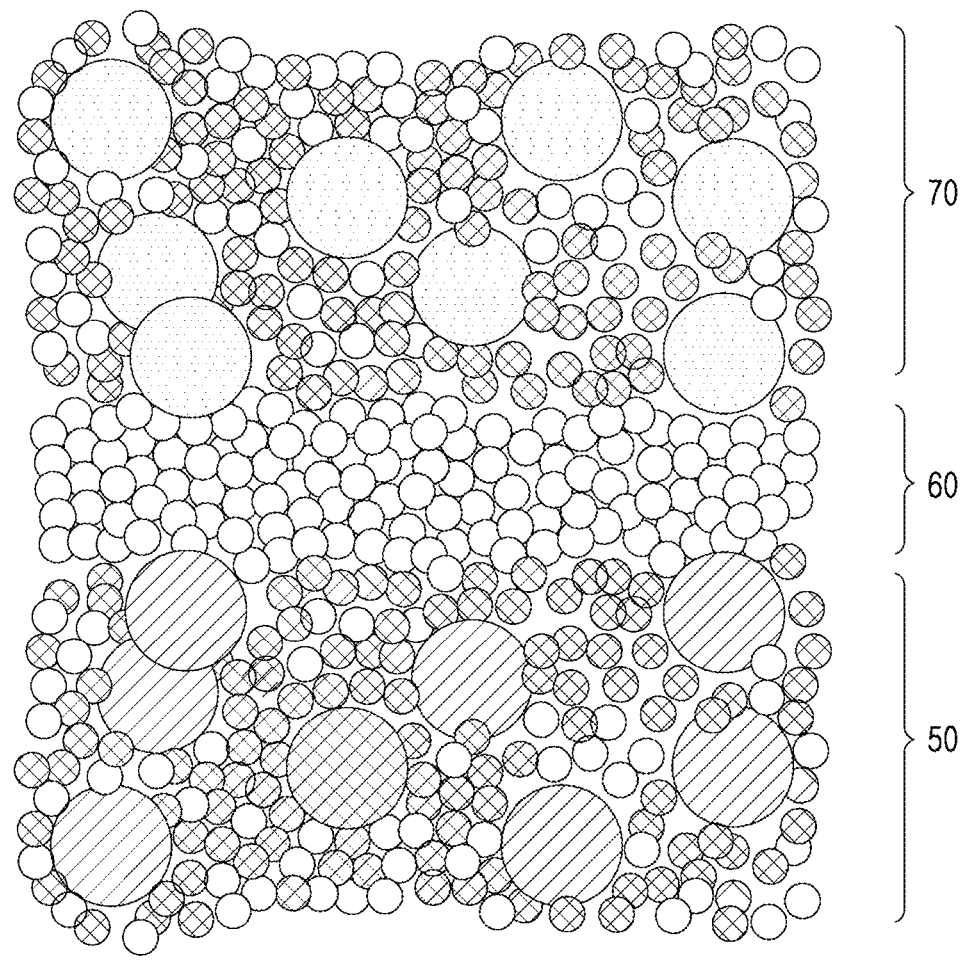

[Fig 11A]

[Fig 11B]
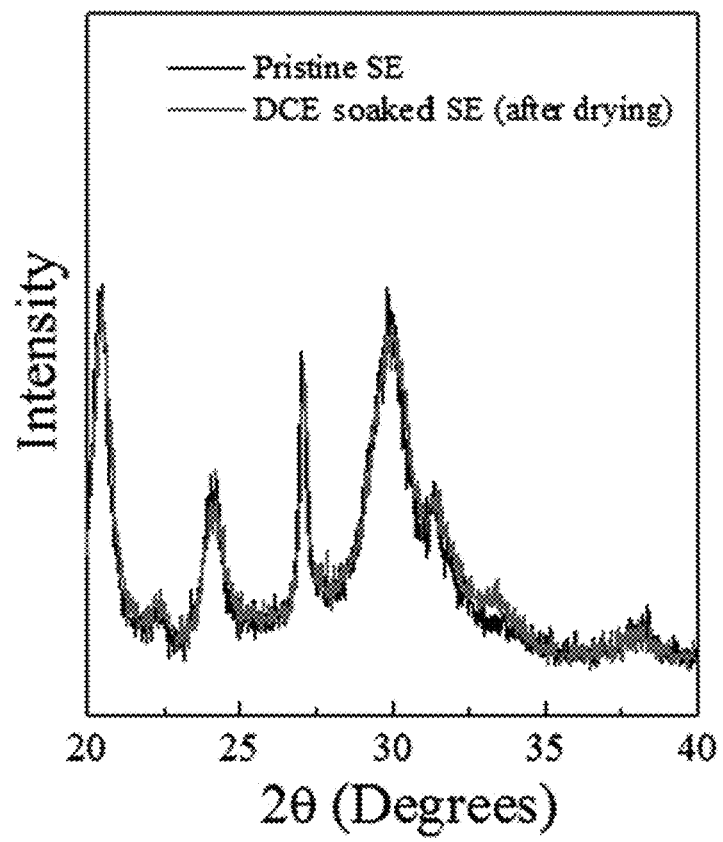
[Fig 11C]
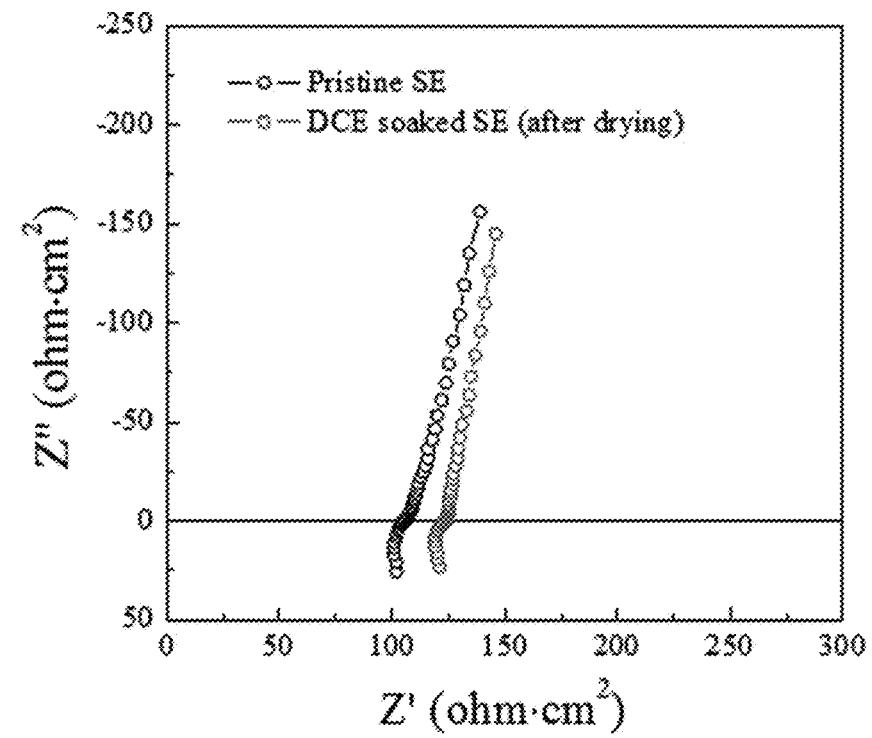

[Fig 12A]
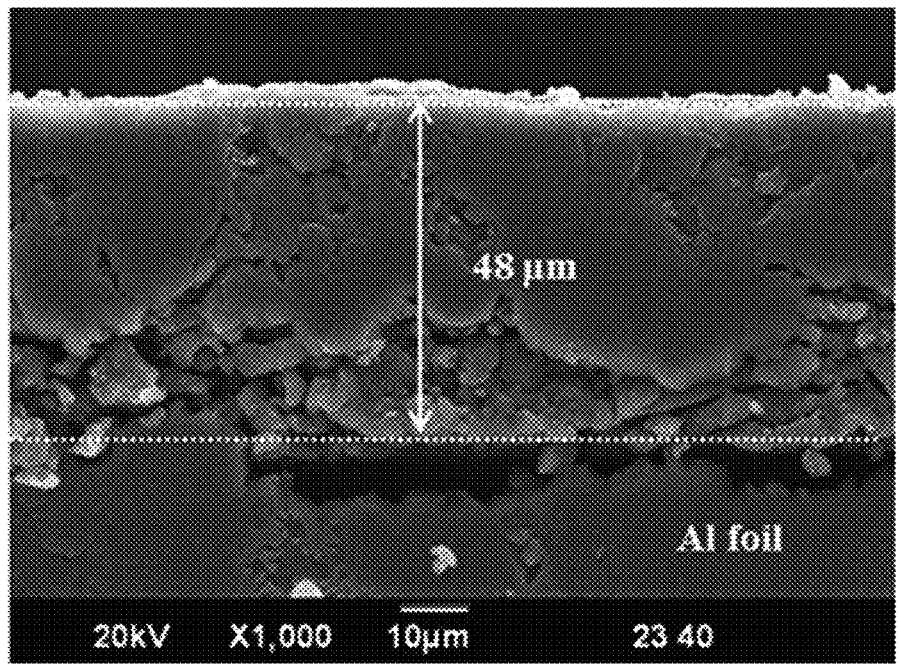
[Fig 12B]
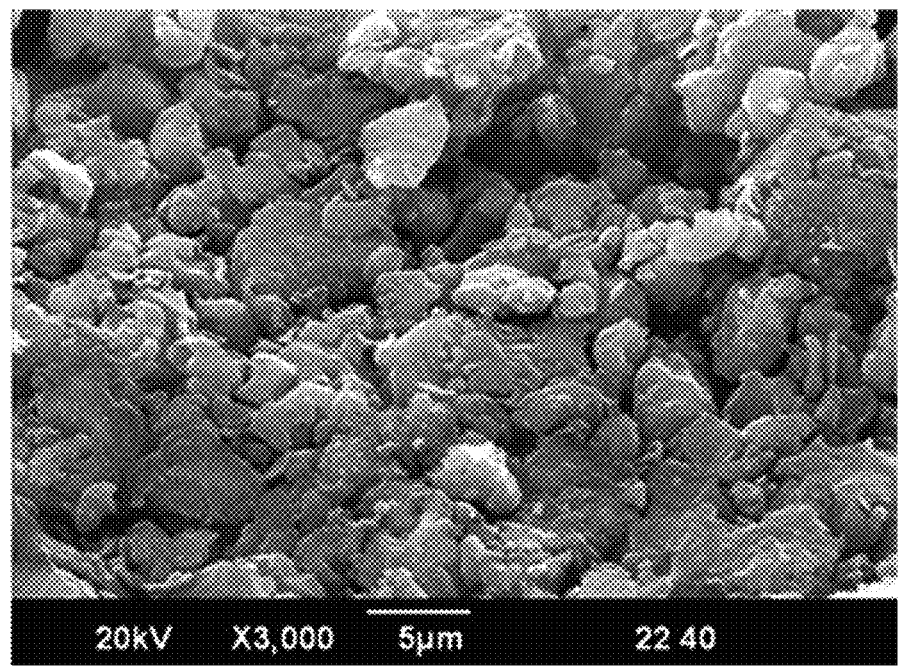

[Fig 13A]
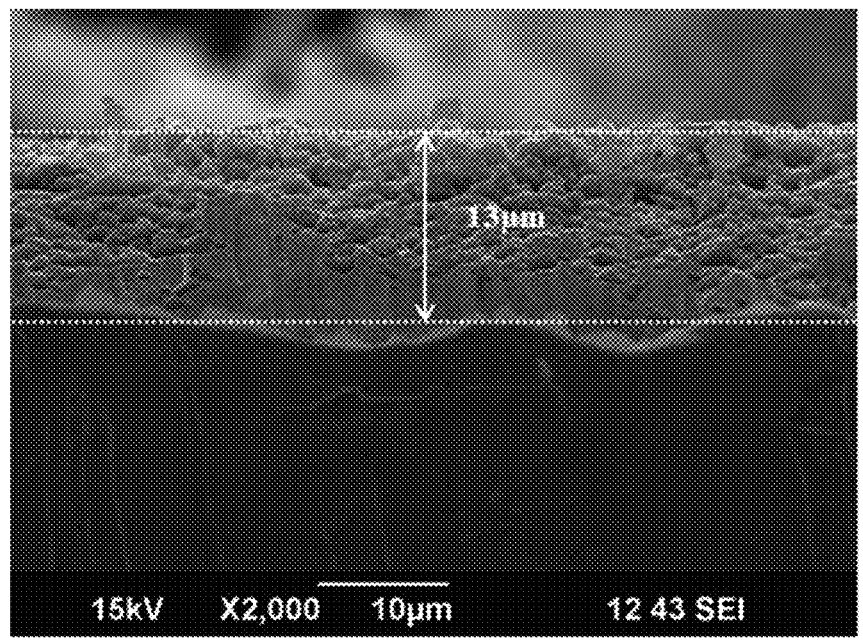
[Fig 13B]
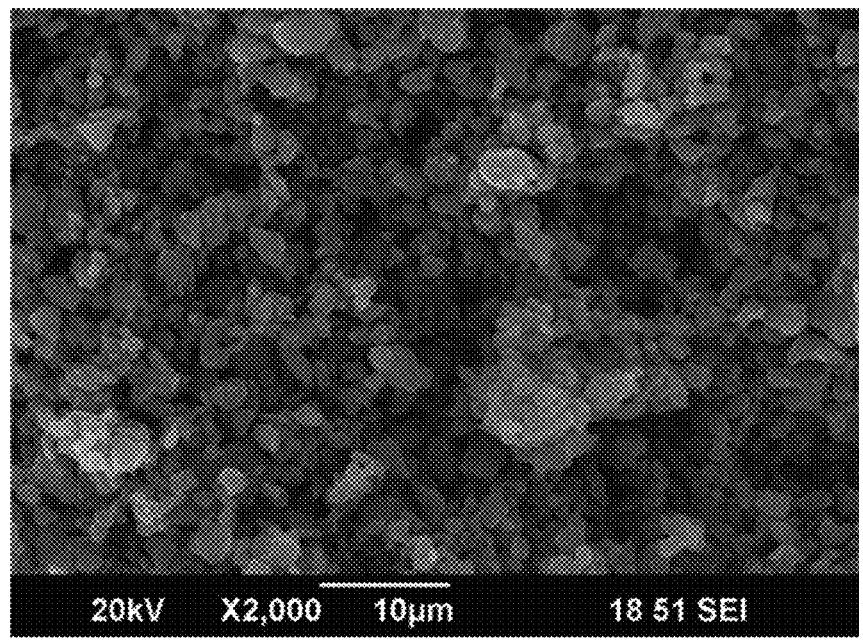

[Fig 14A]
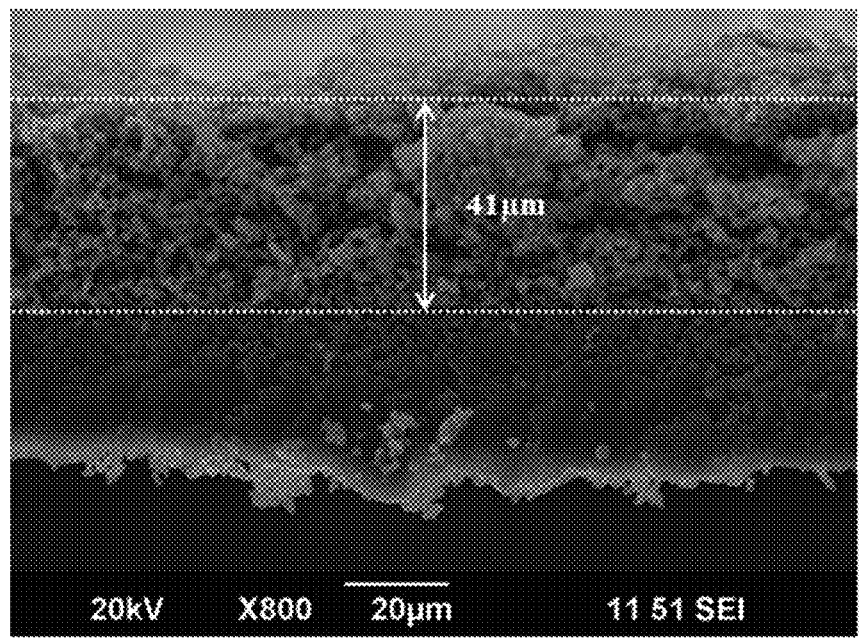
[Fig 14B]
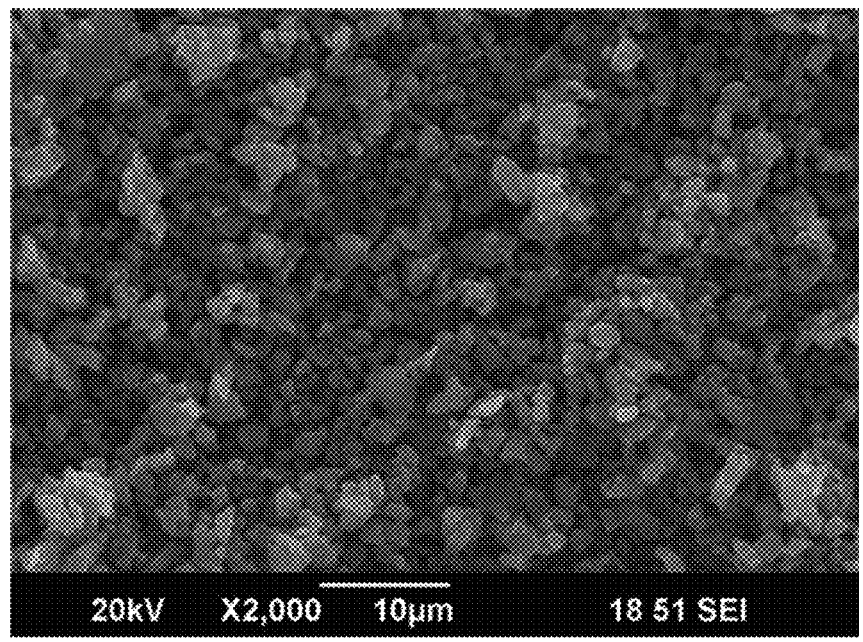

[Fig 15A]
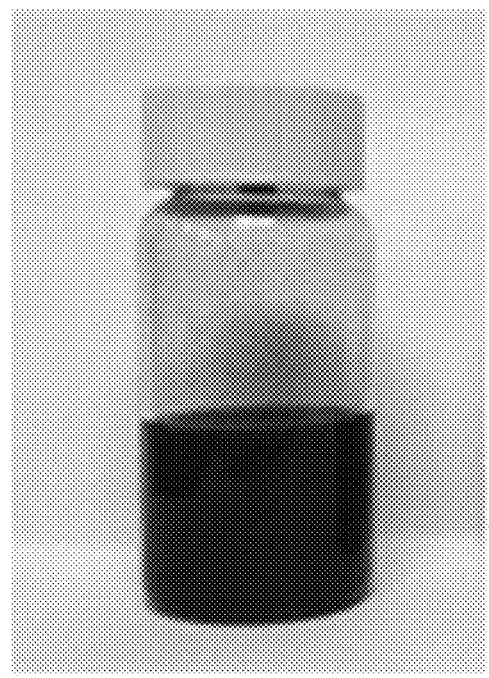
[Fig 15B]
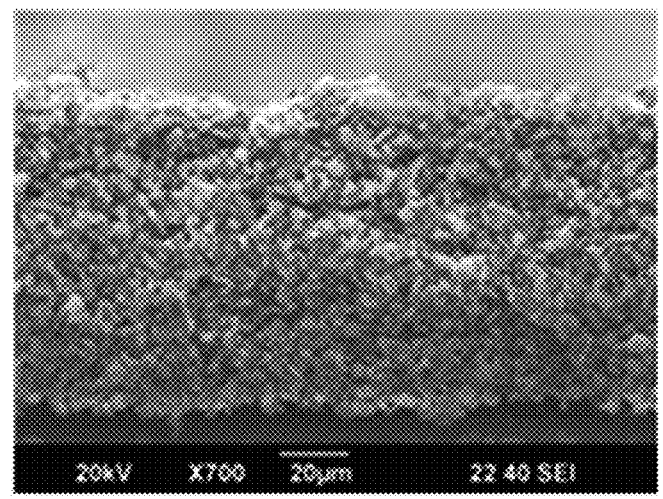

[Fig 15C]
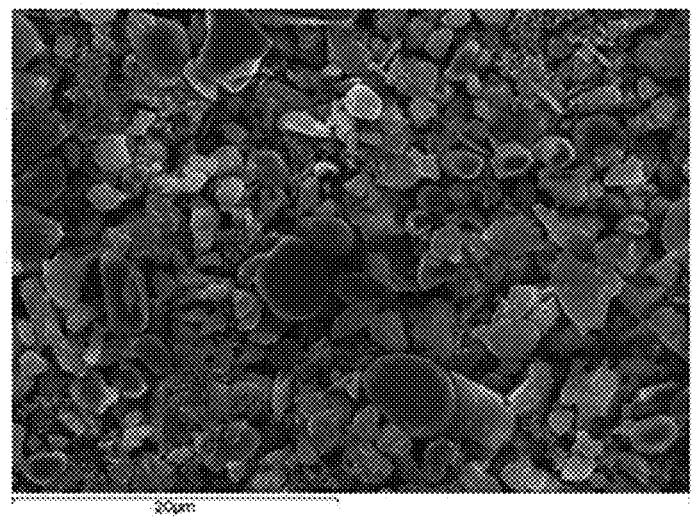
[Fig 15D]
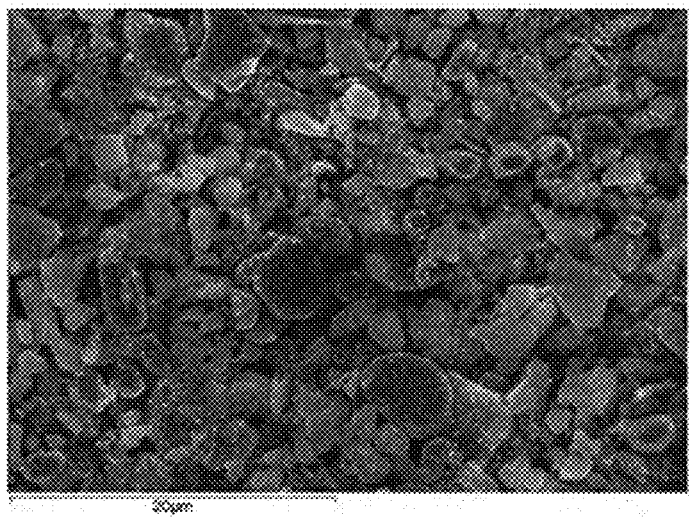

[Fig 16]
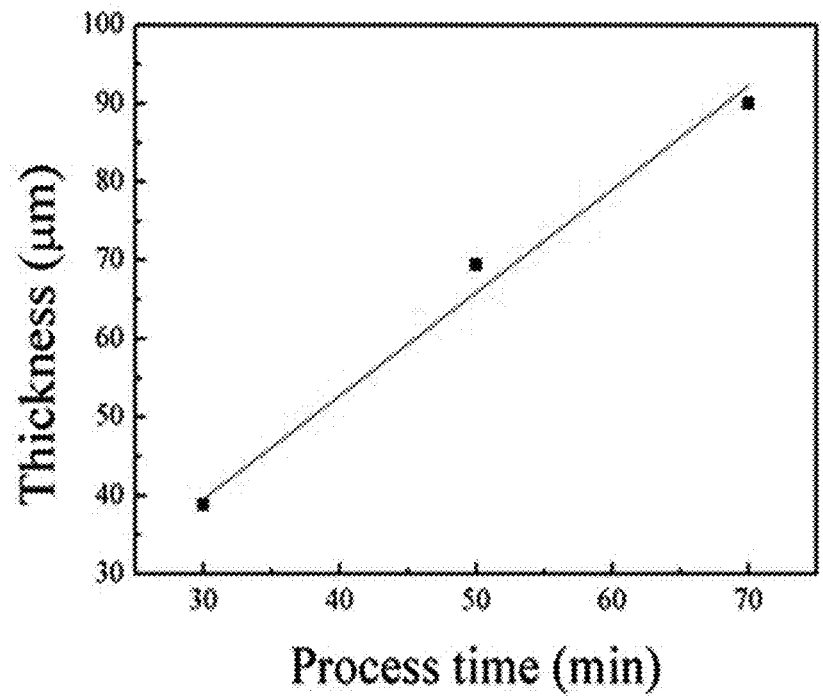
[Fig 17A]
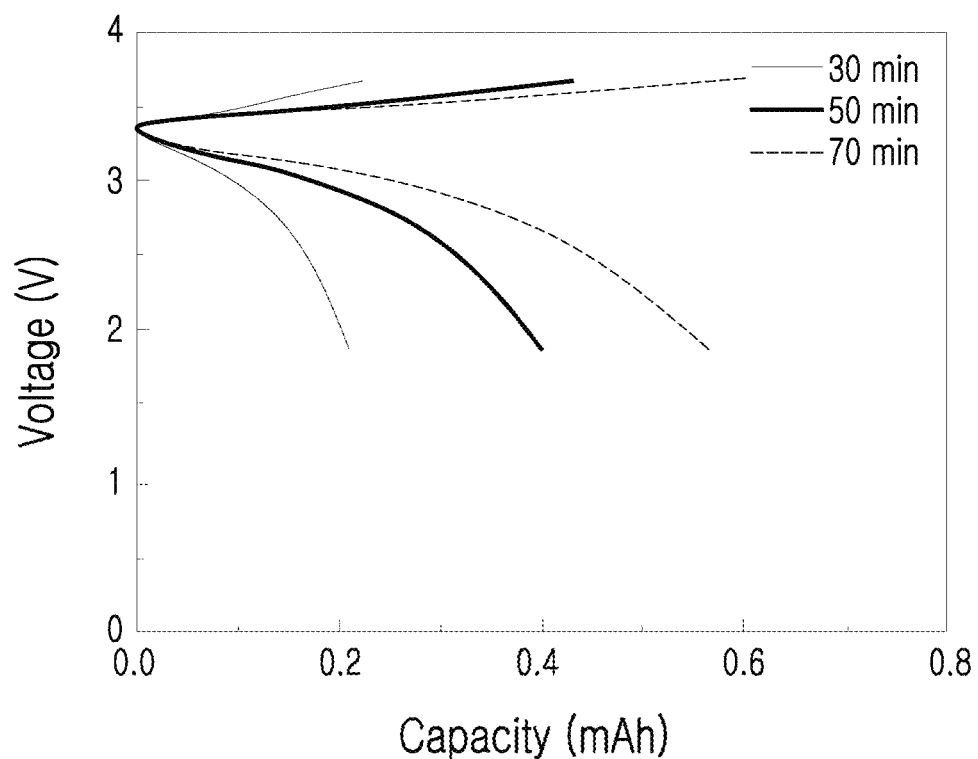

[Fig 17B]
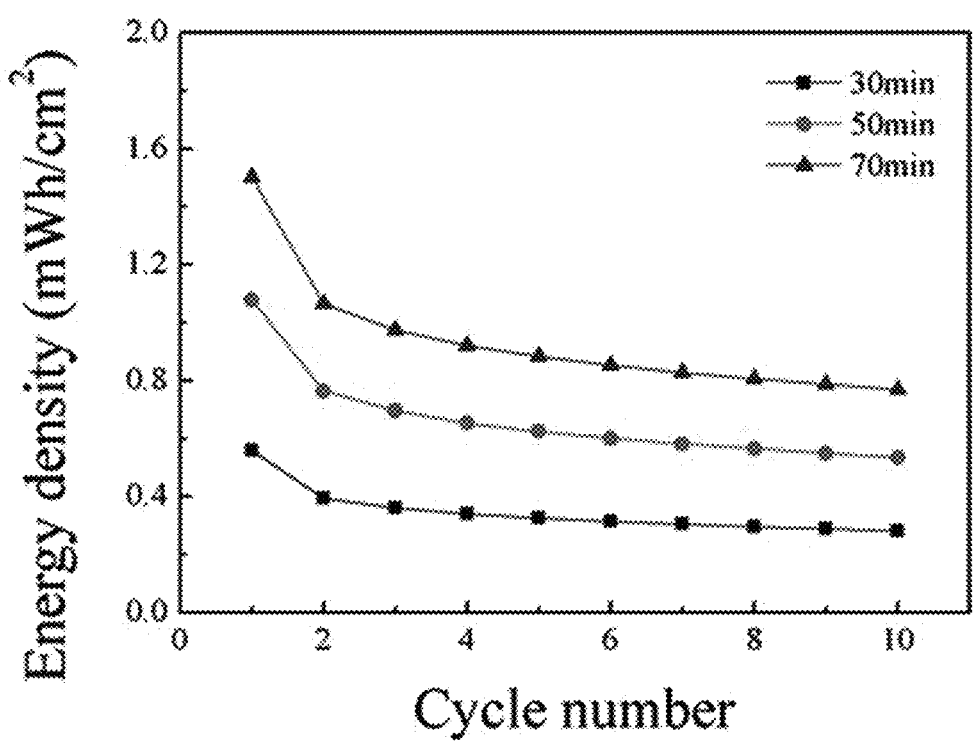

METHOD FOR PRODUCING LITHIUM SECONDARY BATTERY THICK FILM AND METHOD FOR PRODUCING LITHIUM SECONDARY BATTERY BY USING ELECTROSTATIC SLURRY SPRAYING OF SLURRY CONTAINING SULFIDE-BASED SOLID ELECTROLYTE

CROSS REFERENCE TO RELATED APPLICATIONS

This application is a National Stage of International Application No. PCT/KR2017/007758 filed Jul. 19, 2017, claiming priority based on Korean Patent Application No. 10-2016-0091542 filed Jul. 19, 2016.

TECHNICAL FIELD

The present invention relates to a method of forming a lithium secondary battery thick film and a method of manufacturing a lithium secondary battery and, more specifically, to a method of forming a lithium secondary battery thick film by electrostatically spraying a slurry including a sulfide-based solid electrolyte and a method of manufacturing a lithium secondary battery.

BACKGROUND ART

As small electronic devices and electric vehicles come into wide use, demand for secondary batteries with high energy density is increasing. Recently, a lithium secondary battery using lithium ions has been extensively researched and used as a secondary battery.

Since the conventional lithium secondary battery uses a combustible liquid electrolyte, strict packaging is required. As a result, it is difficult to increase energy density beyond a certain level. In addition, a lithium secondary battery using a liquid electrolyte is bulky and thus has a very high risk of ignition and explosion.

In order to overcome the risk, research has been conducted on an all-solid-state secondary battery in which a combustible liquid electrolyte is replaced by a safer inorganic ceramic material. The all-solid-state secondary battery has high energy density and safety and thus is regarded as a next generation secondary battery.

In order to miniaturize the all-solid-state secondary battery, a technology for preparing a solid electrolyte is important. The solid electrolyte may be prepared through a thin film process, a thick film process, or the like. In the case of a vapor deposition method which is mainly used in a semiconductor process as the thin film process, a thickness of an electrolyte may be controlled through a thin film, thereby lowering resistance of the electrolyte. However, a high degree of vacuum should be maintained during a preparing process of the electrolyte. As a result, the process unit cost is high, and it is difficult to continuously form a thin film.

When the all-solid-state secondary battery is manufactured through the thick film process, most of the disadvantages of the thin film process may be supplemented using a compression molding method or a casting method. However, in the compression molding method, it is difficult to increase energy density and to form the secondary battery so as to have a large area. In addition, there is a limitation in low bonding characteristics (interface characteristics) between an electrode layer and a solid electrolyte. Furthermore, in the casting method, interface characteristics are improved, and the solid electrolyte has uniform composition distribution, but it is difficult to control a thickness of a formed thick film, and the thick film may not be formed to have a large area.

DISCLOSURE

Technical Problem

The present invention is directed to providing a method of forming a lithium secondary battery thick film by electrostatically spraying a slurry including a sulfide-based solid electrolyte, by which a thick film may be formed to have excellent bonding characteristics with a current collector and to have a desired thickness and a large area, and a method of manufacturing a lithium secondary battery.

Technical Solution

An aspect of the present invention provides a method of forming a lithium secondary battery thick film by electrostatically spraying a slurry including a sulfide-based solid electrolyte. The method includes preparing a slurry in which a powder of a sulfide-based solid electrolyte is mixed into at least one solvent selected from dichloroethane and dichlorobenzene at a weight ratio of 1:10 to 1:100 and electrostatically spraying the slurry on a current collector in a cone-jet mode in a nitrogen atmosphere to deposit a lithium secondary battery thick film.

The sulfide-based solid electrolyte may include a compound of sulfur and at least two components selected from among lithium, phosphorus, boron, silicon, and aluminum.

In the preparing of the slurry, at least one binder selected from among nitrile butadiene rubber (NBR), polyvinylpyrrolidone (PVP), and polyvinylidene fluoride (PVDF) may be further mixed into the solvent.

In the preparing of the slurry, a powder of an active material and a powder of a conductive material may be further mixed into the solvent, and the lithium secondary battery thick film may be a composite electrode thick film in which the sulfide-based solid electrolyte, the active material, and the conductive material are mixed.

The deposition of the lithium secondary battery thick film may include heating the current collector during the electrostatic spraying of the slurry.

A ratio of an applied voltage to a spray distance to the current collector may be in a range of 1.0 kV/cm to 1.5 kV/cm.

A spray flow rate of the slurry may be in a range of 115 cm/h to 320 cm/h during the electrostatic spraying.

Another aspect of the present invention provides a method of manufacturing a lithium secondary battery. The method includes electrostatically spraying a first composite electrode slurry including a powder of a sulfide-based solid electrolyte, a powder of a first active material, and a powder of a conductive material to deposit a first lithium secondary battery composite electrode thick film, electrostatically spraying a solid electrolyte slurry including a powder of a sulfide-based solid electrolyte on the first lithium secondary battery composite electrode thick film to deposit a lithium secondary battery solid electrolyte thick film, and electrostatically spraying a second composite electrode slurry including a powder of a sulfide-based solid electrolyte, a powder of a second active material, and a powder of a conductive material on the lithium secondary battery solid electrolyte thick film to deposit a second lithium secondary battery composite electrode thick film. One of the first electrode material and the second electrode material may be a positive electrode material and the other may be a negative electrode material. The first composite electrode slurry, the solid electrolyte slurry, and the second composite electrode slurry may each include at least one solvent selected from dichloroethane and dichlorobenzene and may be electrostatically sprayed in a cone-jet mode in a nitrogen atmosphere.

Advantageous Effects

According to the present invention, a powder of a sulfide-based solid electrolyte can be mixed into a solvent having no reactivity with the powder to prepare a slurry, and the slurry can be sprayed in a cone-jet mode to deposit a lithium secondary battery solid electrolyte thick film, thereby forming a solid electrolyte thick film having excellent bonding characteristics with a current collector so as to have a desired thickness and a large area.

In addition, since a slurry is electrostatically sprayed in a nitrogen atmosphere as an inert gas atmosphere having low reactivity, a cone-jet mode can be stably maintained unlike other inert gas atmospheres such as helium, neon, and argon atmospheres having a low discharge start voltage. Accordingly, a lithium secondary battery thick film can be uniformly formed on a current collector so as to have a desired thickness.

Furthermore, since a slurry is electrostatically sprayed according to a deposition distance, an applied voltage, and/or a flow rate appropriately set such that cone-jet spraying is performed in a nitrogen atmosphere, a cone-jet mode in which the slurry is electrostatically sprayed can be stably maintained, and a secondary battery solid electrolyte thick film can be formed to have a desired thinness.

In addition, since a slurry including a sulfide-based solid electrolyte and a binder is stably sprayed in a cone-jet mode, an amount of the binder required to be used to bond the slurry to a current collector can be greatly reduced. Thus, it is possible to reduce an organic material acting as a resistance component in a solid electrolyte thick film, thereby further improving ion conductivity of a sulfide-based solid electrolyte having the ion conductivity higher than that of an oxide-based electrolyte.

Furthermore, since a slurry, in which a sulfide-based solid electrolyte, an active material, and a conductive material are mixed together, is electrostatically sprayed to form a lithium secondary battery composite electrode on a current collector, an electrode layer itself having excellent bonding characteristics can be easily formed to have a desired thickness and a large area.

In addition, a slurry including a powder of a sulfide-based solid electrolyte powder (and a powder of an electrode material) is electrostatically sprayed rather than a precursor solution, thereby forming a solid electrolyte thick film (and a composite electrode thick film) in which excellent characteristics of a raw powder are maintained and a thickness and an area thereof are freely adjusted to desired levels.

Furthermore, since a current collector substrate is heated during electrostatic spraying of a slurry, it is possible to increase strength in which a lithium secondary battery solid electrolyte thick film and/or a composite electrode thick film are bonded to the current collector substrate and mechanical strength of the thick film itself without a separate sequential drying process and to reduce a process time required for forming the thick film.

In addition, since a slurry including a solid electrolyte is electrostatically sprayed and a slurry including a solid electrolyte, an active material, and a conductive material is electrostatically sprayed through a continuous process, it is possible to manufacture a lithium secondary battery in which a composite positive electrode thick film, a solid electrolyte thick film, and a composite negative electrode thick film are consecutively, easily, and sequentially stacked to have a large area without a separate vacuum state required for a thin film process. Thus, it is possible to simplify a manufacturing process of the lithium secondary battery, shorten a process time, and reduce process cost.

The effects of the present invention may not be limited to the above effects, and other effects of the present invention may be comprehended by those skilled in the art from the following description.

DESCRIPTION OF DRAWINGS

FIG. 1 is a schematic view illustrating an electrostatic spraying device for spraying a slurry including a sulfide-based solid electrolyte according to an embodiment of the present invention.

FIGS. 2 and 3A-3F are views illustrating various modes in which a slurry including a sulfide-based solid electrolyte may be electrostatically sprayed according to an embodiment of the present invention.

FIG. 4 is a view illustrating a spraying mode according to a gas atmosphere in which a slurry including a sulfide-based solid electrolyte may be electrostatically sprayed and an applied voltage according to an embodiment of the present invention.

FIG. 5 is a graph showing a discharge start voltage according to a gas atmosphere in which a slurry may be electrostatically sprayed and a pressure according to an embodiment of the present invention.

FIG. 6 is a scatter plot showing a cone-jet-sprayable region according to a spray distance by which a slurry may be electrostatically sprayed and an applied voltage according to an embodiment of the present invention.

FIG. 7 is a scatter plot showing a cone-jet-sprayable region according to a flow rate at which a slurry may be electrostatically sprayed according to an embodiment of the present invention.

FIG. 8 is a schematic cross-sectional view illustrating a lithium secondary battery solid electrolyte thick film formed by depositing a sulfide-based solid electrolyte through electrostatic slurry spraying according to an embodiment of the present invention.

FIG. 9 is a schematic cross-sectional view illustrating a lithium secondary battery solid electrolyte thick film formed by depositing a composite electrode including a sulfide-based solid electrolyte, an active material, and a conductive material through electrostatic slurry spraying according to an embodiment of the present invention.

FIG. 10 is a schematic cross-sectional view illustrating a composite positive electrode thick film, a solid electrolyte thick film, and a composite negative electrode thick film deposited by electrostatically spraying slurries according to an embodiment of the present invention.

FIG. 11A is an image showing a slurry prepared by mixing a sulfide-based solid electrolyte into a solvent according to Preparation Example 1.

FIGS. 11B and 11C are graphs showing X-ray diffraction charts and conductivities before and after a solid electrolyte powder is mixed into a solvent to prepare the slurry of Preparation Example 1.

FIGS. 12A and 12B are scanning electron microscope (SEM) images showing a cross-sectional view and a plan view of a sulfide-based solid electrolyte thick film deposited through electrostatic slurry spraying according to Preparation Example 2.

FIGS. 13A and 13B are SEM images showing a cross-sectional view and a plan view of a sulfide-based solid electrolyte thick film deposited through electrostatic slurry spraying according to Preparation Example 3.

FIGS. 14A and 14B are SEM images showing a cross-sectional view and a plan view of a sulfide-based solid electrolyte thick film deposited through electrostatic slurry spraying according to Preparation Example 4.

FIG. 15A is an image showing a slurry prepared by mixing a sulfide-based solid electrolyte, an active material, and a conductive material into a solvent according to Preparation Example 5.

FIG. 15B is a SEM image showing a cross-sectional view of a composite electrode thin film deposited through electrostatic slurry spraying according to Preparation Example 5.

FIGS. 15C and 15D are a SEM image and an energy dispersive X-ray spectroscopy (EDX) mapping image showing plan views of the composite electrode thin film deposited through electrostatic slurry spraying according to Preparation Example 5.

FIG. 16 is a graph showing a thickness according to a deposition time of electrostatic slurry spraying of a composite electrode formed according to an embodiment of the present invention.

FIGS. 17A and 17B are graphs showing battery characteristics of a lithium secondary battery including a composite electrode thick film deposited through electrostatic slurry spraying according to FIG. 16.

MODES OF THE INVENTION

Hereinafter, the present invention will be described in detail with reference to the accompanying drawings. The present invention may, however, be embodied in different forms and should not be construed as limited to embodiments set forth herein.

An aspect of the present invention provides a method of forming a lithium secondary battery thick film, the method including preparing a slurry in which a powder of a sulfide-based solid electrolyte is mixed into at least one solvent selected from dichloroethane and dichlorobenzene at a weight ratio of 1:10 to 1:100 and electrostatically spraying the slurry on a current collector in a cone-jet mode in a nitrogen atmosphere to deposit a lithium secondary battery thick film. The deposition of the lithium secondary battery thick film may include heating the current collector during the electrostatic spraying of the slurry.

The powder of the sulfide-based solid electrolyte includes sulfur with at least two components selected from among lithium, phosphorus, boron, silicon, and aluminum as an ion conductor. For example, the powder may include compounds selected from among $P_2S_5$, $P_2S_3$, $SiS_2$, $Al_2S_3$, $B_2S_3$, $Na_4SiO_4$, $Na_2S$, $GeS_2$, $NaBO_2$, $NaAlO_3$, $Li_4SiO_4$, $Li_2S$, $Li_3PO_4$, $Li_4SO_4$, $Li_3AlO_3$, $LiBO_2$, and $LiBF_4$ so as to include sulfur and two or more components selected from among Li, P, B, Si, and Al.

The solvent into which the powder of the sulfide-based solid electrolyte is mixed is a solvent having no reactivity with the powder of the sulfide-based solid electrolyte. For example, the solvent may include at least one selected from 1,2-dichloroethane and 1,2-dichlorobenzene.

The powder of the sulfide-based solid electrolyte may be mixed into the solvent at a weight ratio of 1:10 to 1:100. When the weight ratio of the powder of the sulfide-based solid electrolyte to the solvent is less than 1:10, the powder may not be uniformly dispersed in a slurry composition. Thus, agglomeration, aggregation, precipitation, or the like between the slurry compositions may occur to cause nozzle clogging in an electrostatic spraying process to be described later. Even when the weight ratio is greater than 1:100, a dispersion effect for a preparing cost of a slurry may not be greatly increased. Therefore, the mixing ratio of the powder to the solvent may be in a range of 1:10 to 1:100 in terms of manufacturing costs of a slurry and a thick film.

According to an embodiment, a binder may be further mixed into the solvent. The binder may increase a bonding force of slurry particles to the current collector and/or a bonding force between the slurry particles when the slurry is electrostatically sprayed. The binder may include, for example, nitrile butadiene rubber (NBR), polyvinylpyrrolidone (PVP), polyvinylidene fluoride (PVDF), or the like. In this case, the binder may be mixed into the solvent in an amount of 0.1 wt % to 3 wt %. When a lithium secondary battery solid electrolyte thick film is formed through a conventional casting method, the binder should be included in an amount of 10 wt % or more in order to increase the physical strength and bonding force of the formed solid electrolyte thick film. However, according to the present invention, due to electrostatic spraying conditions of the slurry and/or a substrate being heated during the spraying, the amount of the binder added to the preparation of the slurry for the bonding force of the solid electrolyte thick film may be greatly reduced to a small amount of 3 wt % or less. As described above, according to the present invention, since the amount of the binder added to the slurry composition is reduced, it is possible to reduce an organic material acting as a resistance component in a solid electrolyte thick film and to further improve ion conductivity of a deposited sulfide-based solid electrolyte thick film.

According to an embodiment, powders of an active material and a conductive material may be further mixed into the solvent together with the powder of the sulfide-based solid electrolyte. The active material may include a positive electrode active material or a negative electrode active material.

The positive electrode active material may include a compound selected from among $LiCoO_2$, $LiMnO_2$, $LiMn_2O_4$, $LiNiO_2$, $Li(Ni_aCo_bMn_c)O_2$ ($0<a<1$, $0<b<1$, $0<c<1$, and $a+b+c=1$), $LiNi_{1-x}Co_xO_2$ ($0\le x<1$), $LiCo_{1-x}Mn_xO_2$ ($0\le x<1$), $LiNi_{1-x}Mn_xO_2$ ($0\le x<1$), $LiCoPO_4$, $LiFePO_4$, and the like.

The negative electrode active material may include, for example, a carbon material such as graphite, a carbon fiber, polyacene, a vapor grown carbon fiber, coke, or a mesocarbon microbead, a metal such as Li, In, Al, or Si, or an alloy thereof.

The conductive material may include carbon (C), Ni, or the like. For example, when the conductive material includes C, the conductive material may include carbon black such as acetylene black, thermal black, or channel black, graphite, carbon fiber, or the like.

Even when the powders of the active material and the conductive material are further mixed into the solvent together with the powder of the sulfide-based solid electrolyte, the powders may be mixed into the solvent at a weight ratio of 1:10 to 1:100. As described above, when the slurry composition includes the powder of the solid electrolyte, the powder of the active material, and the powder of the conductive material, a composite electrode in which an electrolyte, an active material, and a conductive material are mixed may be formed through electrostatic spraying to be described later.

On the other hand, the powders may have a particle size that increases dispersion stability in the slurry and does not cause clogging of a nozzle used in electrostatic spraying. For example, the powders may have a particle size of 1 nm to 3 µm. The particle size may be obtained by milling the powders using a ball mill device such as a planetary ball mill, a vibrating ball mill, or a horizontal ball mill.

In the present invention, the slurry prepared by mixing the powders into the solvent may not include a separate dispersant. This is because a dispersion degree of the powder particles is improved by the mixing ratio of the powders to the solvent as described above and a slurry is uniformly deposited by a cone-jet mode to be described later.

Hereinafter, a method of forming a lithium secondary battery thick film by electrostatically spraying the prepared slurry will be described.

FIG. 1 is a schematic view illustrating an electrostatic spraying device for spraying a slurry including a sulfide-based solid electrolyte according to an embodiment of the present invention.

Referring to FIG. 1, the electrostatic spraying device may include a syringe including a slurry 10, a nozzle 20 through which the slurry is sprayed from the syringe, and a stage on which a current collector 40 is disposed. A certain electric field may be formed between the nozzle 20 and the current collector 40. The current collector 40 on which the slurry is electrostatically sprayed may include a metal such as Al, Ti, Cu, Au, Pt, or Ni.

In this case, the thickness, uniformity, surface characteristics, and the like of a thick film deposited on the current collector 40 may be changed according to a distance between the nozzle 20 and the current collector 40, a magnitude of the electric field applied between the nozzle 20 and the current collector 40, a flow rate of the slurry ejected from the nozzle 20, and the like. Specifically, the slurry 10 may be sprayed in a cone-jet mode by the electrostatic spraying device. When the slurry 10 is sprayed on the current collector 40 in the cone-jet mode, the thick film deposited on the current collector 40 may be formed to have a desired thickness and a large area while being formed to have a uniform thickness.

FIGS. 2 and 3A-3F are views illustrating various modes in which a slurry including a sulfide-based solid electrolyte may be electrostatically sprayed according to an embodiment of the present invention.

Referring to FIG. 2, in the case of a cone-jet mode, the slurry may be continuously sprayed in the form of a Taylor-cone 31 from an outlet of the nozzle 20 to form a stable jet 33 in which slurry particles are concentrated. The slurry particles 35 may be uniformly sprayed from the jet 33 to the current collector 40.

Referring to FIGS. 3A-3F, the slurry ejected through the outlet of the nozzle may be sprayed in other modes such as a dripping mode (see FIG. 3A), a microdripping mode (see FIG. 3B), a spindle mode (see FIG. 3C), a multi-spindle mode (see FIG. 3D), a cone-shift mode (see FIG. 3E), and a multi jet mode (see FIG. 3F) according to an electrostatic spraying conditions. In the case of the dripping mode (see FIG. 3A), the microdripping mode (see FIG. 3B), the spindle mode (see FIG. 3C), and the multi-spindle mode (see FIG. 3D), since slurry particles are intermittently sprayed through the outlet of the nozzle, a thickness of a lithium secondary battery thick film deposited on the current collector 40 may be non-uniform, and it is difficult to control the thick film to have a desired thickness. In the case of the cone-shift mode (see FIG. 3E) and the multi jet mode (see FIG. 3F), the slurry particles may be continuously sprayed. However, a jet may be shifted, or it may be difficult to precisely estimate a position where the jet is formed when viewed from above. Thus, there still exists a problem in that it is difficult to deposit a lithium secondary battery thick film to have a desired thickness.

On the contrary, as shown in FIG. 2, when the slurry is sprayed in the cone-jet mode through the outlet of the nozzle, a concentrated jet in a continuous, stable, and soft form may be formed at a center of the nozzle. Thus, a lithium secondary battery thick film deposited on the current collector 40 may be controlled to have a desired thickness and may be uniformly formed.

FIG. 4 is a view illustrating a spraying mode according to a gas atmosphere in which a slurry including a sulfide-based solid electrolyte may be electrostatically sprayed and an applied voltage according to an embodiment of the present invention.

Referring to FIG. 4, FIG. 4 illustrates results of measuring a spraying mode according to a voltage applied during electrostatic spraying in each gas atmosphere in which the slurry including the sulfide-based solid electrolyte is electrostatically sprayed. In the present embodiment, a slurry, in which 0.015 g of PVP as a binder, 1.5 g of a mixed powder of a positive active material, a solid electrolyte, and a conductive material (i.e., a mixed powder of 63 wt % of $LiCoO_2$, 2 wt % of carbon black (Super-P), and 34 wt % of $75Li_2S$-$25P_2S_5$ glass ceramic as a solid electrolyte powder) were mixed into 20 mL of a 1,2-dichloroethane solvent, was sprayed at a flux of 3 mL/hr in a state of being spaced a distance of 13 cm from a current collector.

In order to stably spray a slurry during an electrostatic spraying process, an inert gas atmosphere may be used. Generally, the inert gas atmosphere may include a helium, neon, argon, nitrogen, or hydrogen atmosphere. However, according to the present invention, in order to spray a slurry, for example, in which a powder of a sulfide-based solid electrolyte powder and the like is mixed into a 1,2-dichloroethane solvent, in a cone-jet mode, a certain electric field voltage should be maintained in a specific gas atmosphere. Specifically, when a slurry is electrostatically sprayed in an argon (Ar) gas atmosphere, only a dripping mode, which is an intermittent spraying mode, is formed even until an applied voltage is in a range of about 13 kV to 14 kV, and a stable cone-jet mode is difficult to form. However, when a voltage applied by an electrostatic spraying device is further increased to form the cone-jet mode, a spark discharge may be caused in the argon gas atmosphere due to a high voltage. Therefore, when the slurry in which the sulfide-based solid electrolyte powder and the like are mixed into the solvent is electrostatically sprayed in an argon (Ar) gas, it is difficult to spray the slurry in the stable cone-jet mode. Thus, it is difficult to control a lithium secondary battery thick film formed on a current collector to have a desired thickness.

On the other hand, when the slurry is electrostatically sprayed in a nitrogen ($N_2$) gas atmosphere, a cone-jet mode may be formed at an applied voltage of 10 kV to 16 kV, preferably, 12 kV to 15 kV. Thus, a lithium secondary battery thick film may be uniformly formed to have a desired thickness.

Meanwhile, even when electrostatic spraying is performed in an air atmosphere including nitrogen ($N_2$) and oxygen ($O_2$), a cone-jet mode may be stably formed at an applied voltage of 11 kV to 15 kV. However, when materials included in a lithium secondary battery thick film are exposed to oxygen in the atmosphere, the materials may be degraded. Thus, it is preferable that electrostatic spraying is performed in a cone-jet mode in a nitrogen atmosphere.

FIG. 5 is a graph showing a discharge start voltage according to a gas atmosphere in which a slurry may be electrostatically sprayed and a pressure according to an embodiment of the present invention.

Referring to FIG. 5, FIG. 5 shows discharge start voltages (breakdown voltages) of helium, neon, argon, hydrogen, and nitrogen gas according to pressure. Each of the gases shows a tendency in which the discharge start voltage is increased as a degree of vacuum is decreased to 1 Torr to 1,000 Torr. In this case, according to the present invention, since the slurry may be electrostatically sprayed at atmospheric pressure (700 Torr to 1,000 Torr), a vacuum atmosphere as in a conventional vapor deposition method is not required. During electrostatic spraying in such an atmospheric pressure range, at voltage A around 10 kV, which is an applied voltage required to form a cone jet mode, the discharge start voltages of other inert gases (He, Ne, Ar, and $H_2$) except for nitrogen gas are not sufficiently increased, and thus, the cone-jet mode is difficult to form and a spark discharge occurs in the atmospheres of the other gases.

On the other hand, not only an applied voltage but also a distance between a nozzle and a current collector affects the formation of the cone-jet mode. In an embodiment, a slurry, in which 0.975 g (63 wt %) of a powder of an active material ($LiCoO_2$ (LCO)), 0.525 g (34 wt %) of a powder of a solid electrolyte ($75Li_2S$-$25P_2S_5$), and 0.03 g (2 wt %) of a powder of a conductive material (carbon) were mixed into a 20 mL of a 1,2-dichloroethane solvent and 0.015 g (1 wt %) of PVP as a binder was added to the mixed solution, electrostatically sprayed in a nitrogen atmosphere, and then, results of measuring whether a cone-jet mode was formed according to a spray distance and an applied voltage were summarized in Table 1 and FIG. 6.

TABLE 1

| Nozzle-substrate distance (cm) | Applied voltage (kV) | Formation of cone-jet mode |
|---|---|---|
| 8 | 6 | — |
| 8 | 8 | ○ |
| 8 | 12 | ○ |
| 8 | 15 | — |
| 10 | 8 | — |
| 10 | 11 | ○ |
| 10 | 14 | ○ |
| 10 | 18 | — |
| 12 | 9 | — |
| 12 | 14 | ○ |
| 12 | 18 | ○ |
| 12 | 20 | — |
| 14 | 12 | — |
| 14 | 14 | ○ |
| 14 | 20 | ○ |

FIG. 6 is a scatter plot showing a con-jet-sprayable region according to a spray distance by which a slurry may be electrostatically sprayed and an applied voltage according to an embodiment of the present invention.

Referring to Table 1 and FIG. 6, it can be seen that when a spray distance between a nozzle and a current collector is constant, a cone-jet mode is formed only within a certain voltage range. Specifically, a cone-jet mode was formed when a ratio of an applied voltage to the spray distance between the nozzle and the current collector was in a range of 1.0 kV/cm to 1.5 kV/cm. When the above ratio was less than 1.0 kV/cm, a slurry was sprayed in a dripping mode, and thus, intermittent spraying was performed. When the above ratio exceeded 1.5 kV/cm, the spray was sprayed in a cone-shift mode, and thus, a stable spraying region was not formed.

The same slurry as that described above was used, and results of measuring whether a cone jet mode was formed according to a flow rate of the slurry supplied from a nozzle were summarized in Table 2 and FIG. 7.

TABLE 2

| Nozzle radius (cm) | Cross-sectional area (cm²) | Spray flux (mL/h) | Flow rate (cm/h) | Formation of cone-jet mode |
|---|---|---|---|---|
| 0.1 | 0.0314 | 5 | 159 | ○ |
|  |  | 10 | 318 | ○ |
|  |  | 15 | 478 | — |
|  |  | 20 | 637 | — |
|  |  | 25 | 796 | — |
|  |  | 30 | 955 | — |
| 0.15 | 0.0707 | 5 | 71 | — |
|  |  | 10 | 141 | ○ |
|  |  | 15 | 212 | ○ |
|  |  | 20 | 283 | ○ |
|  |  | 25 | 354 | — |
|  |  | 30 | 424 | — |
| 0.2 | 0.1256 | 5 | 40 | — |
|  |  | 10 | 80 | — |
|  |  | 15 | 119 | ○ |
|  |  | 20 | 159 | ○ |
|  |  | 25 | 199 | ○ |
|  |  | 30 | 239 | ○ |

FIG. 7 is a scatter plot showing a con-jet-sprayable region according to a flow rate at which a slurry may be electrostatically sprayed according to an embodiment of the present invention.

Referring to Table 2 and FIG. 7, it can be seen that a cone-jet mode is formed when a flow rate of a slurry supplied from a nozzle is within a certain range. Specifically, a cone-jet mode may be formed when a spray flow rate of the slurry supplied from the nozzle is in a range of 115 cm/h to 320 cm/h. When the spray flow rate was less than 115 cm/h, since a flux supplied from the nozzle was low, intermittent spraying, as in a dripping mode, was performed. When the spray flow rate exceeded 320 cm/h, continuous spraying was performed. However, since the flux was high, spraying was performed in a cone-shift or multi-jet mode.

As described above, in order to electrostatically spray a slurry including a sulfide-based solid electrolyte in a cone-jet mode, while the slurry is supplied at a constant flow rate through an outlet of a nozzle, it is important to apply a voltage capable of being balanced with surface tension of a liquid in a state in which a current collector and a nozzle are spaced apart from each other by an appropriate distance. In this case, when a sufficient voltage is not applied, it is difficult to form or maintain a cone-jet mode itself. When an excessively high voltage is applied, an insulation state of a gas is disturbed, and a spark discharge occurs with a loud noise, and thus it is difficult to form a uniform thick film controlled to have a uniform thickness. In addition, due to the spark discharge, an electrostatic spraying device is damaged, or a risk is increased.

Therefore, when the slurry should be electrostatically sprayed according to a deposition distance, an applied voltage, and/or a flow rate appropriately set such that cone-jet spraying is possible in a nitrogen atmosphere, a cone-jet mode may be stably maintained, and a lithium secondary battery solid electrolyte thick film having excellent bonding characteristics with a current collector may be uniformly formed to have a desired thinness.

Meanwhile, referring again to FIG. 1, the current collector 40 may be heated by a certain heat source while the slurry is electrostatically sprayed. The heat source may include a heating wire or a light source (halogen lamp, UV lamp, or the like). As described above, since a thick film deposited on the current collector 40 is dried by the heat source while the slurry is electrostatically sprayed, mechanical strength of the thick film and a bonding degree between the thick film and the current collector 40 may be increased, and contact performance of the thick film may be improved. Furthermore, a subsequent drying process is unnecessary, and a process time required for forming a thick film may be shortened.

FIG. 8 is a schematic cross-sectional view illustrating a lithium secondary battery solid electrolyte thick film formed by depositing a sulfide-based solid electrolyte through electrostatic slurry spraying according to an embodiment of the present invention.

Referring to FIG. 8, in the present embodiment, a solid electrolyte slurry including a sulfide-based solid electrolyte may be electrostatically sprayed on an electrode layer 50 disposed on a current collector 40. For example, the electrode layer 50 may be a positive electrode layer including a positive electrode active material and a conductive material or a negative electrode layer including a negative electrode active material and a conductive material. The positive electrode layer and/or the negative electrode layer may further include a sulfide-based solid electrolyte. In this case, the electrode layer 50 may be a composite electrode thick film formed by electrostatically spraying a composite electrode slurry including a sulfide-based solid electrolyte, an electrode active material, and a conductive material on the current collector 40 in a cone-jet mode. That is, in an embodiment of the present invention, after the composite electrode slurry including the sulfide-based solid electrolyte, the electrode active material, and the conductive material is electrostatically sprayed on the current collector 40 in a cone-jet mode in a nitrogen atmosphere to form the composite electrode thick film 50 uniformly deposited to have a desired thickness, a solid electrolyte thick film 60 may be further deposited on the composite electrode thick film 50 through a continuous process.

FIG. 9 is a schematic cross-sectional view illustrating a lithium secondary battery solid electrolyte thick film formed by depositing a composite electrode including a sulfide-based solid electrolyte, an electrode active material, and a conductive material through electrostatic slurry spraying according to an embodiment of the present invention. FIG. 10 is a schematic cross-sectional view illustrating a composite positive electrode thick film, a solid electrolyte thick film, and a composite negative electrode thick film deposited by electrostatically spraying slurries according to an embodiment of the present invention.

Referring to FIGS. 8 and 9, a composite electrode thick film 50 including a sulfide-based solid electrolyte 61, an active material 51, and a conductive material 53 may be uniformly formed to have a desired thickness on a current collector 40 through cone-jet spraying in a nitrogen atmosphere. Here, while electrostatic spraying conditions (such as a nitrogen atmosphere, an applied voltage, a deposition distance from a nozzle, and a supply flux of a slurry) are maintained to be the same as or similar to electrostatic spraying conditions in which the composite electrode thick film 50 is formed, only a composition of a slurry may be changed to replace a composite electrode slurry with a solid electrolyte slurry. Thus, as shown in FIG. 8, a solid electrolyte thick film 60 may be continuously deposited.

Referring to FIG. 10, a lithium secondary battery may include the lithium secondary battery composite positive electrode thick film 50, the lithium secondary battery solid electrolyte thick film 60, and a lithium secondary battery composite negative electrode thick film 70, which are sequentially stacked. Here, the composite positive electrode thick film 50 may be deposited by electrostatically spraying a slurry in a cone-jet mode in a nitrogen atmosphere, wherein the slurry is obtained by mixing a powder of a sulfide-based solid electrolyte, a powder of a positive electrode, and a powder of a conductive material into a solvent. In addition, the solid electrolyte thick film 60 may be formed by electrostatically spraying a slurry on the composite electrode thick film 50 through a continuous process in the same or similar electrostatic spraying conditions (such as a gas atmosphere, a flow rate, an applied voltage, a deposition distance, and deposition pressure), wherein the slurry is obtained by mixing a powder of a sulfide-based solid electrolyte into a solvent). Furthermore, the composite negative electrode thick film 70 may be deposited by electrostatically spraying a slurry on the solid electrolyte thick film 60 through a continuous process in the same or similar electrostatic spraying conditions, wherein the slurry is obtained by mixing a powder of a sulfide-based solid electrolyte, a powder of a negative electrode active material, and a powder of a conductive material into a solvent). According to an embodiment, the deposition order of the composite positive electrode thick film 50 and the composite negative electrode thick film 70 may be changed. For example, the solid electrolyte thick film 60 may be electrostatically sprayed on the composite negative electrode thick film 70, and the composite positive electrode thick film 50 may be electrostatically sprayed on the solid electrolyte thick film 60.

As described above, since the composite electrode slurry and the solid electrolyte slurry are electrostatically sprayed and deposited so as to form a cone-jet mode in a nitrogen atmosphere, and the composite electrode thick films and the solid electrolyte thick film are formed through a continuous process, unlike a conventional compression molding method, it is possible to maintain excellent bonding characteristics (interface characteristics) between the lithium secondary battery composite electrode thick film and the lithium secondary battery solid electrolyte thick film and to easily control a thickness of a thick film at a desired level. Furthermore, it is possible to form a thick film having a uniform thickness so as to have a large area. In addition, it is possible to shorten a process time required for forming the composite electrode thick film and the solid electrolyte thick film and to reduce manufacturing costs.

Preparation Example 1

1.5 g of $75Li_2S$-$25P_2S_5$ glass ceramic as a solid electrolyte powder and 0.015 g of a PVP binder were mixed into 20 mL of 1,2-dichloroethane solvent to prepare a sulfide-based solid electrolyte slurry.

FIG. 11A is an image showing a slurry prepared by mixing a sulfide-based solid electrolyte into a solvent according to Preparation Example 1. FIGS. 11B and 11C are graphs showing X-ray diffraction charts and conductivities before and after a solid electrolyte powder is mixed into a solvent to prepare the slurry of Preparation Example 1.

Referring to FIG. 11A, the slurry according to the present Preparation Example is yellow due to a solid electrolyte component. In FIG. 11B, as results of analyzing an X-ray diffraction (XRD) pattern of a solid electrolyte powder (Pristine SE) before being mixed into the 1,2-dichloroethane (DCE) solvent and an XRD pattern of a solid electrolyte powder (DCE soaked SE) obtained by mixing the solid electrolyte powder (Pristine SER) into the DCE solvent and then drying the mixed solution again, it was confirmed that the results exhibited almost the same peak pattern. In addition, in FIG. 11C, as a result of measuring conductivities of the solid electrolyte powder before and after being mixed into the solvent, it was confirmed that there was no significant change in conductivity. Therefore, it could be seen that that the DCE solvent had almost no reactivity with the solid electrolyte powder mixed with a slurry composition.

Preparation Example 2

A slurry, in which 0.5 g of $75Li_2S-25P_2S_5$ glass ceramic as a solid electrolyte powder and 0.005 g (1 wt %) of a PVP binder were mixed into 20 mL of a DCE solvent, was electrostatically sprayed on a current collector (Al foil). A flow rate of the slurry was 5 mL/hr, a deposition distance from a nozzle was 12 cm, an applied voltage was maintained in a range of 15 kV to 16 kV in a nitrogen atmosphere, and the slurry was sprayed in a cone-jet mode. As a result of performing deposition for 30 minutes, a solid electrolyte thick film having a thickness of 48 μm was formed. From an image of a cross section (see FIG. 12A) and an image of a surface (see FIG. 12B) of the deposited thick film, it could be confirmed that a thickness of the solid electrolyte thick film was highly uniform and surface characteristics thereof were excellent.

Preparation Example 3

A slurry, in which 0.5 g of $75Li_2S-25P_2S_5$ glass ceramic as a solid electrolyte powder and 0.005 g (1 wt %) of a PVDF binder were mixed into 20 mL of a DCE solvent, was electrostatically sprayed on a current collector (Ni foil). A flow rate of the slurry was 6.5 mL/hr, a deposition distance from a nozzle was 12 cm, an applied voltage was maintained in a range of 15 kV to 16 kV in a nitrogen atmosphere, and the slurry was sprayed in a cone-jet mode. As a result of performing deposition for 10 minutes, a solid electrolyte thick film having a thickness of 13 μm was formed. From an image of a cross section (see FIG. 13A) and an image of a surface (see FIG. 13B) of the deposited thick film, similar to Preparation Example 2, it could be confirmed that a thickness of the solid electrolyte thick film was very uniform and surface characteristics thereof were excellent.

Preparation Example 4

A slurry, in which 0.5 g of $75Li_2S-25P_2S_5$ glass ceramic as a solid electrolyte powder and 0.015 g (3 wt %) of a PVP binder were mixed into 20 mL of a DCE solvent, was electrostatically sprayed on a current collector (aluminum foil). A flow rate of the slurry was 6.5 mL/hr, a deposition distance from a nozzle was 12 cm, an applied voltage was maintained in a range of 15 kV to 16 kV in a nitrogen atmosphere, and the slurry was sprayed in a cone-jet mode. As a result of performing deposition for 30 minutes, a solid electrolyte thick film having a thickness of 41 μm was formed. From an image of a cross section (see FIG. 14A) and an image of a surface (see FIG. 14B) of the deposited thick film, similar to Preparation Examples 2 and 3, it could be confirmed that a thickness of the solid electrolyte thick film was very uniform and surface characteristics thereof were excellent Preparation Example 5

0.975 g (63 wt %) of a powder of an active material (LCO), 0.525 g (34 wt %) of a powder of a solid electrolyte ($75Li_2S-25P_2S_5$), and 0.03 g (2 wt %) of a powder of a conductive material (carbon) were mixed into 20 mL of a DCE solvent, and 0.015 g (1 wt %) of a PVP binder was added to the mixed solution to prepare a composite electrode slurry (see FIG. 15A). The composite electrode slurry was black due to a conductive material (carbon) component.

The prepared slurry was electrostatically sprayed on a current collector (Al foil). A flow rate of the slurry was 8 mL/hr, a deposition distance from a nozzle was 12 cm, an applied voltage was maintained in a range of 17 kV to 18 kV in a nitrogen atmosphere, and the slurry was sprayed in a cone-jet mode. As a result of performing deposition for 30 minutes, a composite electrode thick film having a thickness of 90 μm was formed. From an image of a cross section (see FIG. 15A) and an image of a surface (see FIG. 15B) of the deposited thick film, it could be confirmed that a thickness of the composite electrode thick film was very uniform and surface characteristics thereof were excellent Referring to FIG. 15D, FIG. 15D shows an image obtained by energy dispersive X-ray spectroscopy (EDX)-mapping an electrode material and a solid electrolyte on a scanning electron microscope (SEM) surface image shown in FIG. 15C. In FIG. 15D, a green color indicates an electrode material ($LiCoO_2$), and a red color indicates a solid electrolyte ($75Li_2S-25P_2S_5$). As can be seen from the EDX image, it can be seen that the electrode material, the solid electrolyte, and the conductive material are well mixed in the composite electrode thick film.

FIG. 16 is a graph showing a thickness according to a deposition time of electrostatic slurry spraying of a composite electrode formed according to an embodiment of the present invention.

Referring to FIG. 16, a change in thickness is shown when the composite electrode slurry according to the embodiment is deposited for 30 minutes, 50 minutes, and 70 minutes. As results of measuring the thickness of the composite electrode slurry deposited through electrostatic spraying, it was confirmed that a continuous deposition rate was 1.32 mm/min. As a result, it can be seen that a composite electrode thick film having a desired thickness may be formed through a continuous process.

FIGS. 17A and 17B are graphs showing battery characteristics of a lithium secondary battery including the composite electrode thick film deposited through electrostatic slurry spraying according to FIG. 16.

Referring to 17A, FIG. 17A shows charging/discharging test results of a battery manufactured to have a composite electrode-solid electrolyte-LiIn structure using a 2032 coin cell according to a method of manufacturing a lithium secondary battery according to an embodiment of the present invention. From this, it could be confirmed that even when a deposition time (that is, a thickness of the composite electrode) was changed, a normal charging/discharging cycle was exhibited. In FIG. 17B, it could be seen that a battery capacity increased proportionally to the thickness of the composite electrode. From this, it can be seen that performance of a lithium secondary battery may be improved by applying a method of forming a lithium secondary battery thick film according to the present invention to a continuous process.

As described above, according to the present invention, powders including a sulfide-based solid electrolyte may be mixed into a solvent having no reactivity to prepare a slurry, and the slurry may be sprayed in a cone-jet mode to deposit a lithium secondary battery solid electrolyte/composite electrode thick film, thereby forming a thick film having excellent bonding characteristics with a current collector to have a desired thickness and a large area.

Meanwhile, the embodiments proposed in the specification and the drawings are just specific examples for the better understanding of the present invention and are not intended to limit the scope of the present invention. Therefore, it is obvious to an ordinary person skilled in the art that other equivalents and modifications could be made thereto without departing from the spirit and scope of the present invention.

The invention claimed is:

1. A method of forming a lithium secondary battery thick film by electrostatically spraying a slurry including a sulfide-based solid electrolyte, the method comprising:
    preparing a slurry in which a powder of a sulfide-based solid electrolyte is mixed into at least one solvent selected from dichloroethane and dichlorobenzene at a weight ratio of 1:10 to 1:100; and
    electrostatically spraying the slurry on a current collector in a cone jet mode in a nitrogen atmosphere to deposit a lithium secondary battery thick film.

2. The method of claim 1, wherein the sulfide-based solid electrolyte includes a compound of sulfur and at least two components selected from among lithium, phosphorus, boron, silicon, and aluminum.

3. The method of claim 1, wherein, in the preparing of the slurry, at least one binder selected from among nitrile butadiene rubber (NBR), polyvinylpyrrolidone (PVP), and polyvinylidene fluoride (PVDF) is further mixed into the solvent.

4. The method of claim 1, wherein, in the preparing of the slurry, a powder of an active material and a powder of a conductive material are further mixed into the solvent, and the lithium secondary battery thick film is a composite electrode thick film in which the sulfide-based solid electrolyte, the active material, and the conductive material are mixed.

5. The method of claim 1, wherein the deposition of the lithium secondary battery thick film includes heating the current collector during the electrostatic spraying of the slurry.

6. The method of claim 1, wherein a ratio of an applied voltage to a spray distance to the current collector is in a range of 1.0 kV/cm to 1.5 kV/cm.

7. The method of claim 1, wherein a spray flow velocity of the slurry is in a range of 115 cm/h to 320 cm/h during the electrostatic spraying.

8. A method of manufacturing a lithium secondary battery, the method comprising:
    electrostatically spraying a first composite electrode slurry including a powder of a sulfide-based solid electrolyte, a powder of a first active material, and a powder of a conductive material to deposit a first lithium secondary battery composite electrode thick film;
    electrostatically spraying a solid electrolyte slurry including a powder of a sulfide-based solid electrolyte on the first lithium secondary battery composite electrode thick film to deposit a lithium secondary battery solid electrolyte thick film; and
    electrostatically spraying a second composite electrode slurry including a powder of a sulfide-based solid electrolyte, a powder of a second active material, and a powder of a conductive material on the lithium secondary battery solid electrolyte thick film to deposit a second lithium secondary battery composite electrode thick film,
    wherein one of the first active material and the second active material is a positive active material and the other is a negative active material, and
    the first composite electrode slurry, the solid electrolyte slurry, and the second composite electrode slurry each include at least one solvent selected from dichloroethane and dichlorobenzene and are electrostatically sprayed in a cone-jet mode in a nitrogen atmosphere.

* * * * *